Oct. 18, 1932.                    D. C. PAGE                    1,882,871
                        GEAR HOLDING AND CENTRALIZING DEVICE
                              Filed Feb. 27, 1932
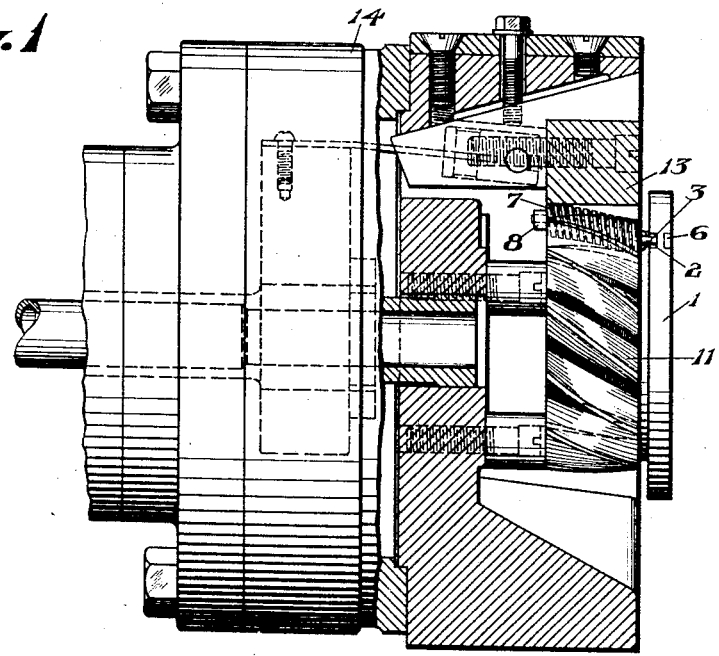
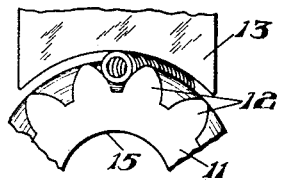
Fig. 4
Fig. 2
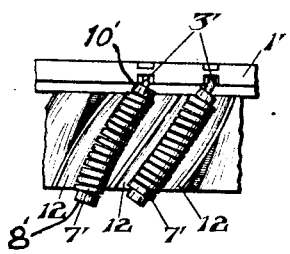
Fig. 3
Inventor
Dwight C. Page
By Geo. H. Kennedy Jr.
Attorney Patented Oct. 18, 1932

1,882,871

UNITED STATES PATENT OFFICE

DWIGHT C. PAGE, OF WORCESTER, MASSACHUSETTS, ASSIGNOR TO THE HEALD MACHINE COMPANY, OF WORCESTER, MASSACHUSETTS, A CORPORATION OF MASSACHUSETTS

GEAR HOLDING AND CENTRALIZING DEVICE

Application filed February 27, 1932. Serial No. 595,441.

The present invention relates to an improved gear holding and centralizing device which is adapted to support a toothed gear with reference to a pitch line or circle so that a grinding or cutting operation performed on an internal opening in the gear will be obsolutely concentric or coaxial with the pitch circle of the teeth and the device is particularly adapted for the support of gears having teeth of the helical type.

The Heald Patent No. 1,058,237, granted April 8, 1913 discloses the use of cylindrical pins in clamping spur gears concentrically within a chuck or work-holder, the cylindrical pins engaging the surfaces of adjacent gear teeth along the pitch line, and the jaws of the chuck engaging said cylindrical pins, thereby centering the gear and clamping it securely in the chuck. Such a construction, however, is not applicable to helical gear teeth since straight cylindrical pins cannot engage along the pitch line of this type of gear teeth over the entire length by reason of the curvature of the teeth.

The invention disclosed in the copending application of Gherald D. Scott, Serial No. 514,565 was arranged to overcome the disadvantages of the construction in the above noted Heald patent by providing a gear holding device by which a plurality of pairs of spherical or elliptical members were positioned in spaced relation around the periphery of a gear, each pair of members being positioned between adjacent gear teeth and being of a size to engage said teeth substantially at the pitch line. The gear is positioned in the chuck by this device through engagement of the jaws of the chuck with the spherical or elliptical members, and the necessarily high pressures exerted by the chuck jaws exerted on the spherical members in clamping the gears securely in the chuck by means of this device result, especially when the gears are of soft material, in permanent small depressions in the faces of the gear teeth. Although these depressions do not effect the operativeness and strength of the gear, they are apparent upon close inspection and often effect the salability of the gear.

Accordingly, one of the principal objects of the present invention is to incorporate in a gear centralizing device, the advantages of the above noted constructions with none of the disadvantages thereof, thereby to permit a helical gear to be clamped and centered in a chuck without damage to the surface of the gear teeth.

According to the present invention, a spiral or helical gear is supported in a chuck by a series of flexible members substantially circular in cross-section which are sufficiently large in diameter to engage adjacent teeth of a gear substantially along the pitch line thereof, and which are sufficiently long to extend over substantially the entire width of the gear. The flexible members thus have line contact with the faces of the gear teeth over the entire length thereof, to distribute the clamping pressures from the chuck jaws over a large area. In certain aspects the device constitutes an improvement over the centralized device described in the above noted copending application of Scott Serial No. 514,565.

The advantages and objects of the invention will appear from the following description with reference to the accompanying drawing in which:—

Fig. 1 is a view partly in section showing a gear held in a suitable chuck by means of the centralizing device.

Fig. 2 is a side elevation of the centralizing device.

Fig. 3 is a fragmentary plan view showing a modification of the device in position on a helical gear.

Fig. 4 is a fragmentary view illustrating the cooperation of the device with the teeth of a gear and the jaws of a chuck.

Like reference characters refer to like parts in the different figures.

Referring to Fig. 2, the invention comprises a base member 1 in the form of a ring which provides a plurality of recesses 2 in which are mounted flexible arms or supports 3, the latter extending from the base 1 at points suitably spaced around its periphery. The arms or supports 3 extend through openings 4 in the base and the ends thereof are bent over for reception in slots 5 in the base member 1 opposite each recess, the ends of said arms being securely held in said slots, as by solder 6. Each of the arms 3 carries a resilient work-engaging member 7 substantially circular in cross-section, which is held on the arm 3 by spaced collars 8 and 10 attached to said arm.

The diameter of the base member 1 is determined by the pitch diameter of the gear to be held and the size of the work-engaging portions 7 is determined by the circular pitch of the gear teeth. In use the device is slipped over a gear 11, Figs. 1 and 4, with the base 1 substantially engaging and parallel to the side of the gear and the arms 3 extending over the faces of the gear teeth 12. With the ring 1 so positioned, the work-engaging members 7 on the arms 3 lie between adjacent gear teeth 12 and engage opposed faces of the teeth substantially at the pitch line, the flexibility of the arms 3, as well as the resiliency of the members 7 permitting said members to position themselves readily between adjacent gear teeth with the members 7 engaging said teeth over substantially the entire width of the gear face so that the gripping action of the work-engaging members 7 is distributed over a large area.

The number and spacing of the arms 3 coincides with the number and spacing of the radially movable jaws 13 of a chuck 14 of usual construction such as shown in Fig. 1, so that when a gear 11 held by the arms 3 is placed in the chuck 14 and the jaws 13 contracted, the work-engaging portions 7 will simultaneously engage the gear teeth 12 and hold the gear firmly in position, and since the work-engaging members engage the gear teeth 12 substantially around the pitch circle, as indicated in Fig. 4, the surfaces of these portions 7 engage all the chuck jaws 13 at the same distance from the center of the pitch circle. Consequently any grinding or cutting operation performed on the interior of the central opening 15 of the gear 11 as the chuck rotates will be absolutely concentric or coaxial with the pitch circle of the teeth 12.

In the modification disclosed in Fig. 3, the flexible arms 3' are arranged in pairs, with the arms of each pair secured to the base member 1' in the manner above pointed out with reference to the construction of Fig. 2, and each arm 3' supports a work-engaging member 7' between spaced collars 8' and 10'. The arms 3' of each pair are spaced apart in accordance with the spacing of adjacent teeth on the gear to be clamped in order that the work-engaging member 7' on the arms of each pair may lie in the grooves between successive gear teeth as shown in Fig. 3, both said work-engaging members of each pair to be engaged by a single jaw of the chuck.

The resilient work-engaging member 7 or the member 7' of Fig. 3 which, as above stated, is substantially circular in cross-section, has the form of a coil spring and thus provides a substantially continuous cylindrical member which, by reason of the coil formation, may be readily distorted along its axis to conform to the pitch line of adjacent helical gear teeth. The wire from which the members 7 or 7' is formed provides an outer flat surface throughout its length so that, as best shown in Fig. 2, the periphery of the coils or work-engaging members consists of a plurality of flat surfaces, all equally spaced from the axis of the work-engaging member, thereby providing a substantially continuous surface for engagement with the gear teeth. It will be noted that, by reason of the coil construction, the members 7 or 7' are resilient, the axis of said members being deformable by a bending action whereby they may be bent to conform to the curvature of the gear teeth, but at the same time, said members are sufficiently rigid to prevent cross-sectional, or radial distortion, as a result of the clamping action of the chuck jaws, thus maintaining the original circular cross-section.

In the use of the device, since the work-engaging members are cylindrical, the portion of the surface of the work-engaging members remote from the center of the gear defines a cylindrical surface parallel to the cylindrical surface defined by the pitch line of the gear so that when the chuck jaws 13 are ground to the proper diameter with the work-engaging faces of the chuck jaws defining cylindrical surfaces concentric to and equally spaced from the axis of the chuck, said chuck jaws will engage the surfaces of the work-engaging members 7 or 7' remote from the center of the workpiece along the entire length thereof, as best shown in Fig. 4. Thus the clamping action between the jaws of the chuck and the workpiece is over substantially the entire width of the gear, providing, as above stated, substantially straight line contact between the work-engaging members and the gear teeth over substantially the entire length of the work-engaging members.

When utilizing gear centralizing devices embodying the present invention, it is necessary to provide a variety of sizes corresponding to the various pitch diameters of workpieces to be operated upon, the work-contacting portions 7 being of such size as to contact with the gear teeth substantially at the pitch line. When it is desired to centralize a gear or workpiece of a predetermined size, a device is selected of the proper diameter with work-contacting portions of the size required for engagement properly with the teeth after which the flexible arms 3 are adjusted to approximate the angularity of the gear teeth. In making such adjustments, the recesses 2 permit the flexible arms to be bent with a comparatively large radius at the points where they are held by the rings avoiding the danger of breaking the arms by repeated bending. The arms 3 having been bent to approximate the angle of the gear teeth, and the gear with the device thereon having been placed in the chuck, the jaws thereof are actuated and the work-engaging members accommodate themselves, by reason of their resiliency to the spaces between adjacent gear teeth.

I claim,

1. A device for centering a helical gear, comprising a base member, a plurality of flexible arms extending from said base, and resilient members on each of said arms for engagement with the teeth of said gear on the pitch line.

2. A device for centering a gear in a clamping device, comprising a base member, a plurality of resilient members extending from said base for engagement between teeth on said gear and the clamping device, said members being so spaced as to engage the gear teeth at different points around the pitch circle.

3. A device of the class described comprising a series of flexible cylindrical members for engagement between adjacent teeth on a gear and of such a size as to engage the gear teeth substantially on the pitch line, and means to hold said members in position.

4. A device for centering a gear in a clamping device, comprising a base member, flexible arms carried by said base and resilient members substantially circular in cross-section on each of said arms for engagement between adjacent gear teeth, the diameter of said resilient members being such as to engage the gear teeth substantially at the pitch line.

5. A device for centering a gear in a clamping device, comprising a base, a plurality of flexible arms and a plurality of cylindrical members on said arms, said members being axially flexible for engagement with the teeth of a gear substantially along the pitch line thereof over substantially the entire length of the gear teeth.

6. A device for centering a helical gear in a clamping device, comprising an annular base, and cylindrical members carried by said base, said cylindrical members being substantially rigid in cross-section and deformable axially by a bending action, whereby said members may be shaped to engage the teeth of the gear substantially along the pitch line throughout the width of said gear.

7. A device for centering a gear in a clamping device, comprising a base, and coil springs carried by said base for engagement with the teeth of said gear substantially along the pitch line thereof.

DWIGHT C. PAGE.